US012607498B2

(12) United States Patent
Larsson et al.

(10) Patent No.: US 12,607,498 B2
(45) Date of Patent: Apr. 21, 2026

(54) FIELD DEVICE AND METHOD FOR REPLACING A SENSOR IN A FIELD DEVICE

(71) Applicant: Rosemount Tank Radar AB, Mölnlycke (SE)

(72) Inventors: Michael Larsson, Gothenburg (SE); Lovisa Rogestedt, Fagerfjäll (SE); Morgan Mårdeland, Gothenburg (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 328 days.

(21) Appl. No.: 18/335,405

(22) Filed: Jun. 15, 2023

(65) Prior Publication Data

US 2024/0011817 A1     Jan. 11, 2024

(30) Foreign Application Priority Data

Jul. 8, 2022     (EP) .................................... 22183984

(51) Int. Cl.
 *G01F 25/20*     (2022.01)
 *G01F 23/80*     (2022.01)
 *H04B 5/72*     (2024.01)
(52) U.S. Cl.
 CPC .............. *G01F 25/20* (2022.01); *G01F 23/80* (2022.01); *H04B 5/72* (2024.01)
(58) Field of Classification Search
 None
 See application file for complete search history.

(56) References Cited

U.S. PATENT DOCUMENTS 8,498,572 B1 * 7/2013 Schooley ............ H04L 12/2809
                                          340/10.51
9,788,357 B2 * 10/2017 Dory ....................... H04W 4/80
               (Continued)

FOREIGN PATENT DOCUMENTS

DE     102013113367 A1     6/2015
DE     102019134197 A1     6/2021
               (Continued)

OTHER PUBLICATIONS

Communication—Extended European Search Report from European Patent Application No. 22183984.8, dated Jan. 3, 2023.

*Primary Examiner* — Mark A Shabman
(74) *Attorney, Agent, or Firm* — Westman, Champlin & Koehler, P.A.

(57)          ABSTRACT

A method for replacing a first sensor with a second sensor in a field device system configured to determine a process variable, each of the first and second sensor provided with near field communication, NFC, functionality, the method includes: connecting the second sensor to an initiation device and initiating the second sensor based on information uniquely identifying the first sensor; disconnecting the second sensor from the initiation device; placing the second sensor in the vicinity of the first sensor; with the first sensor connected to a power source and the second sensor not connected to a power source, communicatively connecting the sensors via NFC and transferring settings from the first to the second sensor; replacing the first sensor with the second sensor; connecting the first sensor to the initiation device; and transferring a verification from the first sensor to the initiation device confirming that the transfer of settings was completed.

9 Claims, 7 Drawing Sheets

(56) References Cited

U.S. PATENT DOCUMENTS

| | | | |
|---|---|---|---|
| 12,430,082 B2 * | 9/2025 | Schwagmann .... | G05B 19/0428 |
| 2015/0113180 A1 * | 4/2015 | Baret .................. | G05B 19/042 |
| | | | 710/36 |
| 2015/0126109 A1 * | 5/2015 | Keshavdas .............. | H04B 5/26 |
| | | | 455/41.1 |
| 2016/0018372 A1 | 1/2016 | Deilmann et al. | |
| 2016/0323825 A1 | 11/2016 | Yamaji et al. | |
| 2016/0357178 A1 * | 12/2016 | Burger-Scheidlin ........................ | |
| | | | G05B 19/4185 |
| 2018/0128670 A1 | 5/2018 | Sears et al. | |
| 2020/0068277 A1 * | 2/2020 | Drewett .................. | H04Q 9/00 |
| 2021/0026001 A1 * | 1/2021 | Welle ..................... | G01S 13/06 |
| 2021/0321240 A1 * | 10/2021 | Reisbick ................ | H04W 4/80 |
| 2022/0278893 A1 | 9/2022 | Isenmann et al. | |

FOREIGN PATENT DOCUMENTS

| | | | | |
|---|---|---|---|---|
| EP | 3598805 A1 * | 1/2020 | ........ | H04W 52/0229 |
| WO | 2021028023 A1 | 2/2021 | | |

* cited by examiner

102

105

202

300

Initiation

202

102

300

Verification

*102,202*

*500*

*Performing a level measurement by the second sensor using the settings transferred from the first sensor to the second sensor* — 600

*Via NFC, transferring a confirmation from the second sensor to the first sensor that the level measurement was performed without error* — 602

FIELD DEVICE AND METHOD FOR REPLACING A SENSOR IN A FIELD DEVICE

CROSS-REFERENCE TO RELATED APPLICATION

This application claims priority to European Patent Application No. 22183984.8, filed Jul. 8, 2022, the content of which is hereby incorporated by reference in its entirety.

FIELD OF THE INVENTION

The present invention relates to a field device configured to determine a process variable and to a method for replacing a sensor in a field device. In particular, the present invention is aimed at simplifying the replacement of a senor in radar level gauge system.

BACKGROUND OF THE INVENTION

Field devices are often used in the industry to measure various process variables, such as pressure, temperature, flow or product level. In particular, a radar level gauge system is an example of a field device which may be used for measuring the level of a product such as a process fluid, a granular compound or another material.

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank.

The transmitted electromagnetic signals are reflected at the surface of the product, and the reflected signals are received by a receiver or transceiver comprised in the radar level gauge. Based on the transmitted and reflected signals, the distance to the surface of the product can be determined. More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Field devices in general and radar level gauge systems in particular are many timed used in hazardous environments and in areas specifically classified as hazardous areas according to existing industry standards. In such applications, replacement and maintenance of the system can be both complicated and dangerous. For example, radar level gauge systems used in the petroleum industry typically need to be Ex-rated which in turn puts limitations on service and maintenance of the system.

Accordingly, there is a need to simplify the installation, service and maintenance of radar level gauge systems, and in particular in applications where such systems are used in dangerous environments.

SUMMARY

In view of above-mentioned problems, it is an object of the present invention to provide a method and system for simplifying the replacement of a sensor in field device which may be located in a hazardous area.

According to a first aspect of the invention, there is provided a method for replacing a first sensor with a second sensor in a field device system (100) configured to determine a process variable, each of the first and second sensor being provided with near field communication, NFC, functionality. The method comprises: connecting the second sensor to an initiation device and initiating the second sensor based on information uniquely identifying the first sensor; disconnecting the second sensor from the initiation device; placing the second sensor in the vicinity of the first sensor so that NFC-communication is enabled; with the first sensor being connected to an external power source and the second sensor not being connected to a power source, communicatively connecting the first sensor to the second sensor via NFC and transferring settings from the first sensor to the second sensor; replacing the first sensor of the field device system with the second sensor; connecting the first sensor to the initiation device; and transferring a verification from the first sensor to the initiation device confirming that the transfer of settings from the first sensor to the second sensor was completed.

A "field device" should be understood to include any device that determines a process variable and communicates a measurement signal indicative of that process variable to a remote location. Examples of field devices include devices for determining process variables such as filling level, temperature, pressure, fluid flow etc.

The present invention is based on the realization that by providing NFC-functionality to the sensors in a field device system, sensor replacement can be significantly simplified by performing initiation of a replacement sensor at a remote location and where all communication between the replacement sensor and the sensor to be replaced takes place via NFC. Near field-communication, NFC, is a well-established standard for close range communication between devices with a typical range of approximately 10 cm. An additional advantage of the claimed invention is that the second sensor can receive information from the first sensor without having to be connected to an external power source. The first sensor is connected to a power source and NFC-communication can thus be powered by the first sensor.

According to one embodiment of the invention, connecting the first and second sensor to the initiation device is performed at a location remote from the field device system. In particular, the remote location is advantageously classified as a non-hazardous area.

There are several existing industry standards which define area as hazardous areas, for example Ex classification relating to areas where there is a risk for explosions or fires. Examples of classifications for hazardous areas include European Union's ATEX directive (2014/34/eu), which prescribes standards for Ex equipment, areas, and labeling requirements within the EU. Another classification system uses a "Zone" system where the classification of zones is based on Article 500 of the National Electrical Code (NEC).

By means of the described method a first sensor being arranged in a hazardous area can be replaced without using an additional power source. The first sensor is provided with power in a manner that is safe for the specific environment where it is located. However, in a conventional manner of replacing a sensor, a second sensor, the replacement sensor, is first installed followed by startup and initiation where an external device such as a laptop or dedicated installation device may have to be connected to the second sensor once installed. Such an external device will then have to fulfil the requirements for a hazardous area. Accordingly, the claimed method both simplifies replacement of a sensor since no external device need to be operated at the location of the sensor, and also improves the safety of an operator since the only required power source is the "safe" power source which is already in place.

Since the second sensor can communicate passively via NFC it does not act as an ignition source which may be the case for a device requiring a built-in or external power source for communicating.

According to one embodiment of the invention, connecting the first and second sensor to the initiation device is done by NFC where the initiation device is configured to provide power to the first and/or second sensor. Communication with the initiation device is advantageously performed by NFC, which means that both the initial initiation of the second sensor and the following confirmation by the first sensor can be performed by any NFC-capable device, such as a smartphone, tablet computer, laptop or PC equipped with an NFC reader.

According to one embodiment of the invention, the second sensor is configured to receive power from the first sensor via NFC and to store the settings transferred from the first sensor to the second sensor. The second sensor can thereby be directly configured with the latest settings of the first sensor to be ready for operation directly after installation.

According to one embodiment of the invention, the information uniquely identifying the first sensor is a serial number of the first sensor. The second sensor can then receive information defining the properties of that specific sensor from e.g. a local database and/or a storage on remote server or in a cloud resource.

According to one embodiment of the invention, each of the first and second sensor comprises a respective window which is electromagnetically transparent to a frequency used for NFC. Field devices are many times arranged in protective housings which may be metallic for mechanical protection and also to protect sensitive measurement circuitry from disturbances. However, the sensors in the described field device system are advantageously equipped with a window allowing NFC-communication with an NFC-circuit located within the housing. NFC operates at a frequency of 13.56 MHz and window transparent to that frequency can for example be made from plastic or the like.

According to one embodiment of the invention, settings transferred from the first sensor to the second comprises a measurement result of a measurement performed by the first sensor. The measurement may be the result from the latest measurement performed by first sensor, and it is also possible to provide a plurality of measurement results describing the behaviour of the process variable being measured.

According to one embodiment of the invention the method further comprises, after the step of replacing the first sensor with the second sensor: performing a measurement by the second sensor using the settings transferred from the first sensor to the second sensor; and via NFC, transferring a confirmation from the second sensor to the first sensor that the measurement was performed without error. Thereby, it can be verified that initiation of the second sensor is correct, that any sensor settings have been transferred correctly from the first sensor to the second sensor, and that the second sensor operates correctly after installation.

According to one embodiment of the invention, the method further comprises transferring the confirmation that the measurement was performed without error from the second sensor to the initiation device. The transfer of the confirmation that the measurement was correct and then part or all of the confirmation required for establishing that the transfer of settings from the first sensor to the second senor was completed.

According to a second aspect of the invention, there is provided a field device arrangement comprising: a first sensor provided with near field communication, NFC, functionality; a second sensor provided with near field communication, NFC, functionality; and an initiation device comprising an interface enabling connection to each of the first and second sensor, wherein the initiation device is configured to initiate the second sensor based on information uniquely identifying the first sensor and to verify a transfer of settings from the first sensor to the second sensor by receiving a verification from the first sensor, wherein the first sensor is configured to transfer settings to the second sensor via NFC, and wherein the second sensor is configured to receive settings from the first sensor without being connected to a power source, and to transfer a verification via NFC to the first sensor that the transfer of settings was completed.

Moreover, each of the first and second sensor may comprise a respective window which is electromagnetically transparent to a frequency used for NFC, i.e. 13.56 MHz. In applications where a sensor housing is made of plastic there is no need for a specific window. However, for sensors with a metal housing a window is required for communication with an NFC-circuit located within the housing. It would also be possible to arrange an NFC-circuit outside of an electromagnetically shielded housing, either outside of the housing as such or in a separate part of the housing.

According to an example embodiment, the first sensor is located in an area classified as a hazardous area and the initiation device is located in an area classified as a non-hazardous area. The second sensor can thereby be initiated in a safe environment and the operations required for replacing the first sensor in the hazardous area can be minimized.

Further effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE
EMBODIMENTS

In the present detailed description, various embodiments of the field device system and method according to the present invention are mainly described with reference to a field device system where the sensor is a radar level gauge installed in a tank. However, the field device system and method for replacing a sensor in a field device is equally applicable to many different types of field devices. Moreover, even though particular advantages can be identified in field device systems installed in hazardous environments, the ease of use and simplification of sensor replacement provided by the claimed invention is advantageous in many different settings.

Figure 1:
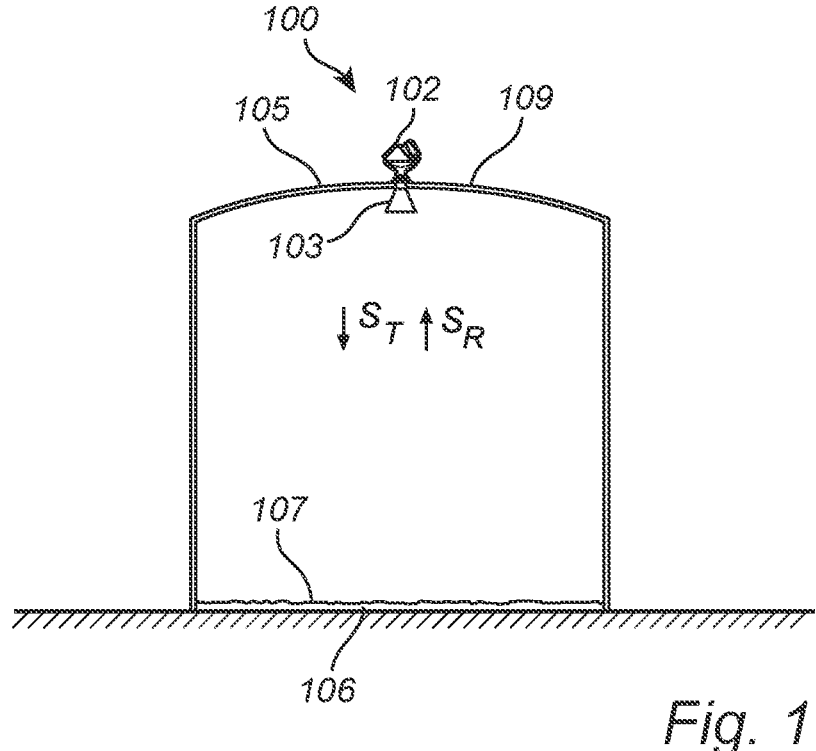
FIG. 1 schematically illustrates an exemplary tank arrangement comprising a radar level gauge system according to an embodiment of the present invention.

FIG. 1 schematically illustrates a radar level gauge system 100 comprising a measurement unit 102 and a signal propagation device, here shown in the form of a horn antenna 103. The measurement unit will also be referred to as the first sensor 102. It should, however, be noted that the signal propagation device may equally well be another type of radiating antenna, or a transmission line probe. The radar level gauge system 100 is arranged on top of a tank 105 for determining the filling level of a product 106 in the tank 105.

When measuring the filling level of the product 106 in the tank 105, the radar level gauge system 100 transmits an electromagnetic transmit signal ST by the horn antenna 103 towards the surface 107 of the product 106, where the signal is reflected as an electromagnetic surface echo signal SR. The distance to the surface 107 of the product 106 is then determined based on the travel time of the electromagnetic surface echo signal SR (from the radar level gauge system 100 to the surface 107 and back). From the travel time, the distance to the surface, generally referred to as ullage, can be determined. Based on this distance (the ullage) and known dimensions of the tank 105, the filling level can be deduced.

Figure 2:
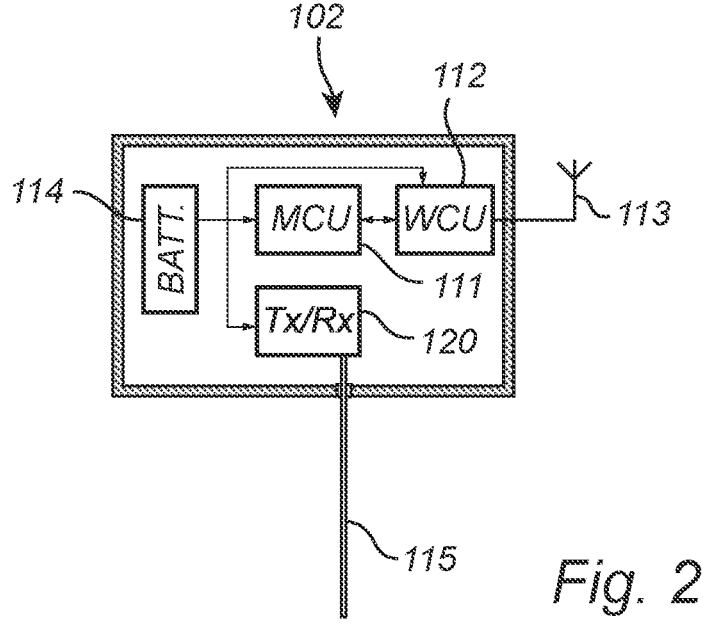
FIG. 2 is a schematic block diagram of a measurement unit of a radar level gauge system according to an embodiment of the invention.

Referring to the schematic block diagram in FIG. 2, the measurement unit 102 of the radar level gauge system 100 in FIG. 1 comprises a transceiver 120, a measurement control unit (MCU) 111, a wireless communication control unit (WCU) 112, a communication antenna 113, an energy store, such as a battery 114, and a tank feed-through 115.

As is schematically illustrated in FIG. 2, the MCU 111 controls the transceiver 110 to generate, transmit and receive electromagnetic signals. The transmitted signals pass through the tank feed-through 115 to the horn antenna 103 (not shown in FIG. 2), and the received signals pass from the horn antenna 103 through the tank feed-through 115 to the transceiver 110.

The MCU 111 determines the filling level of the product 106 in the tank 105 based on the phase difference between the transmit signal ST and the surface echo signal SR. The filling level is provided to an external device, such as a control center from the MCU 111 via the WCU 112 through the communication antenna 113. The radar level gauge system 100 may advantageously be configured according to the so-called WirelessHART communication protocol (IEC 62591).

Although the measurement unit 102 is shown to comprise an energy store 114 and to comprise devices (such as the WCU 112 and the communication antenna 113) for allowing wireless communication, it should be understood that power supply and communication may be provided in a different way, such as through communication lines (for example 4-20 mA lines, HART), in which case the WCU 112 may be replaced by a control unit for wired communication.

The measurement unit 102 further comprises means for NFC-communication (not shown) such as an active NFC-antenna and reader powered by the energy store 114 or by a wired connection. Even though the present disclosure refers to "NFC-communication" as an established standard, near field communication can in the present context include any communications protocol including power transfer which can be used interchangeably with NFC in the method and device of the present disclosure.

Figure 3A:
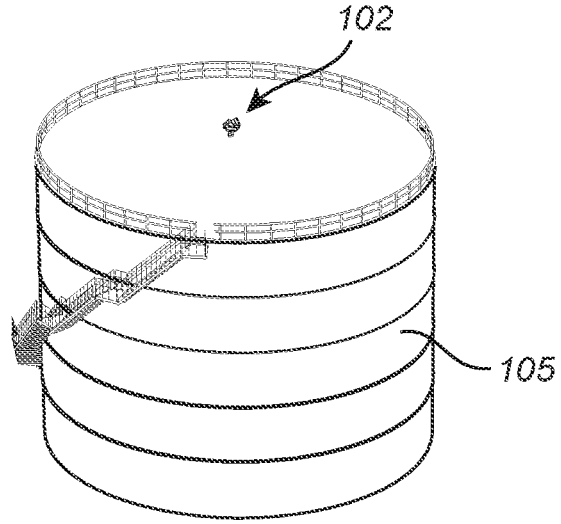
FIG. 3 A-D schematically illustrate steps of a method according to an embodiment of the invention.
Figure 3A:
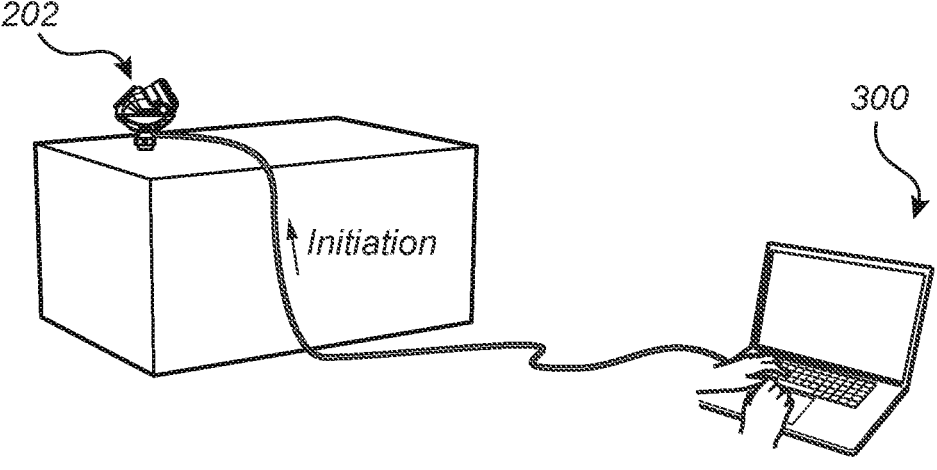
Figure 3B:
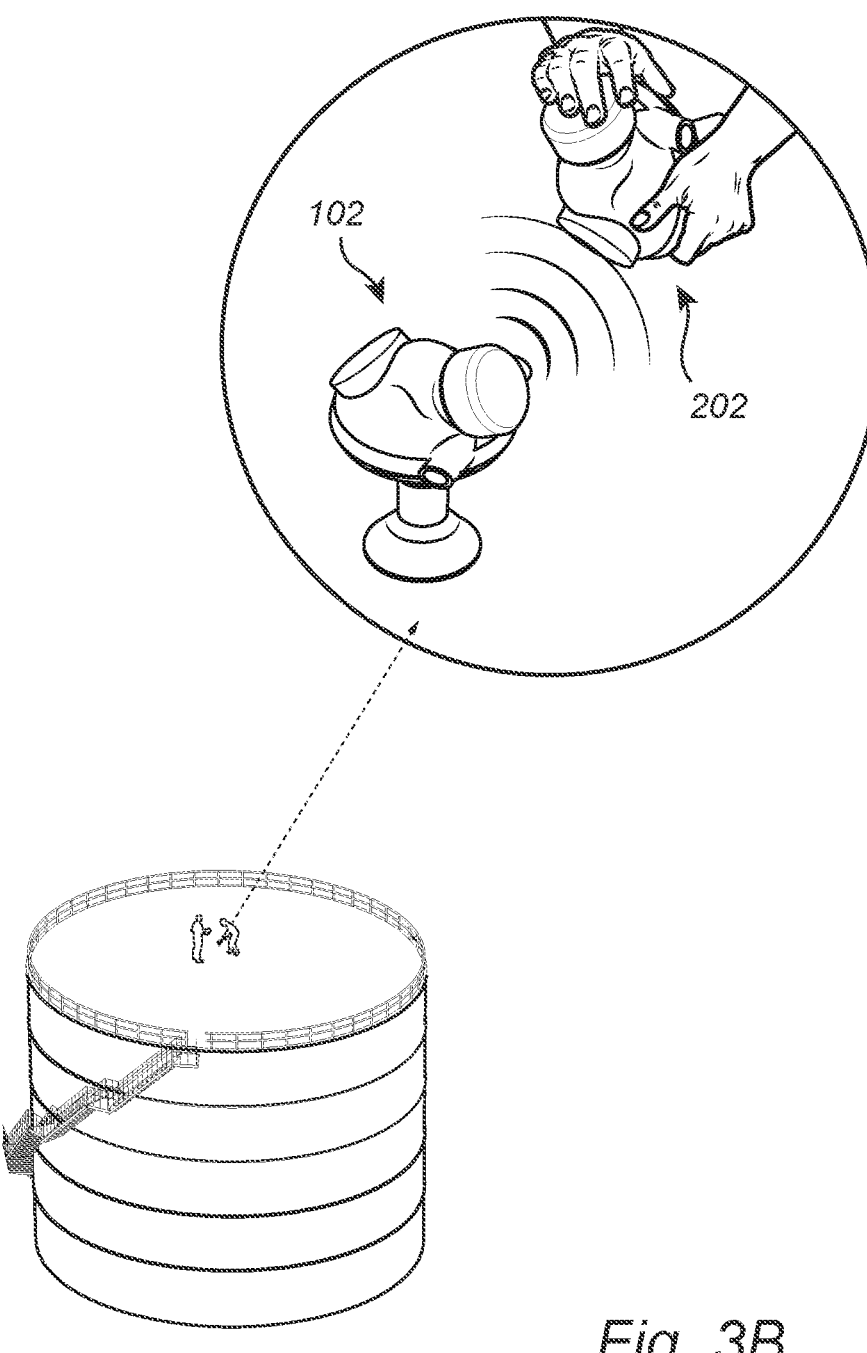
Figure 3C:
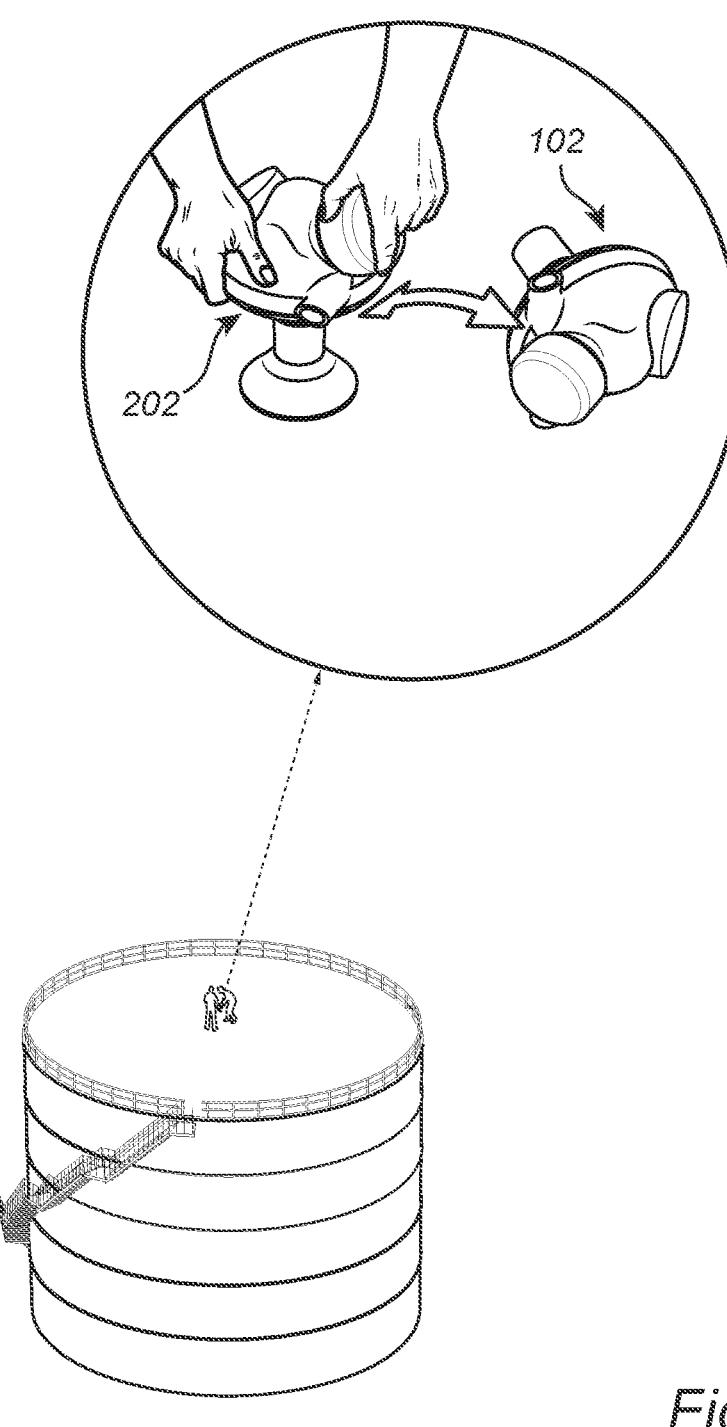
Figure 3D:
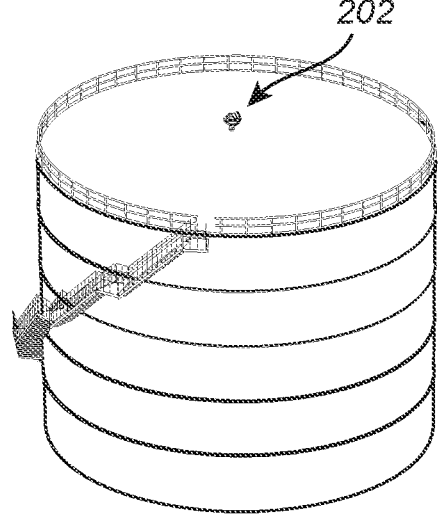
Figure 3D:
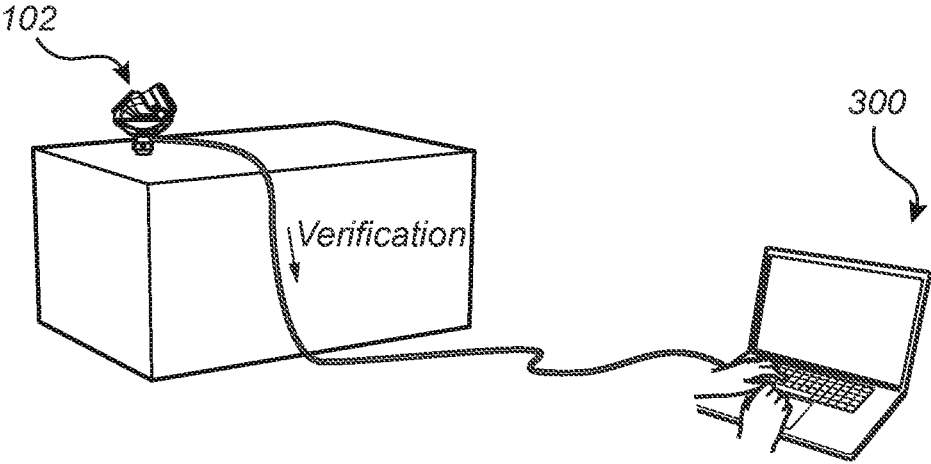
Figure 4:
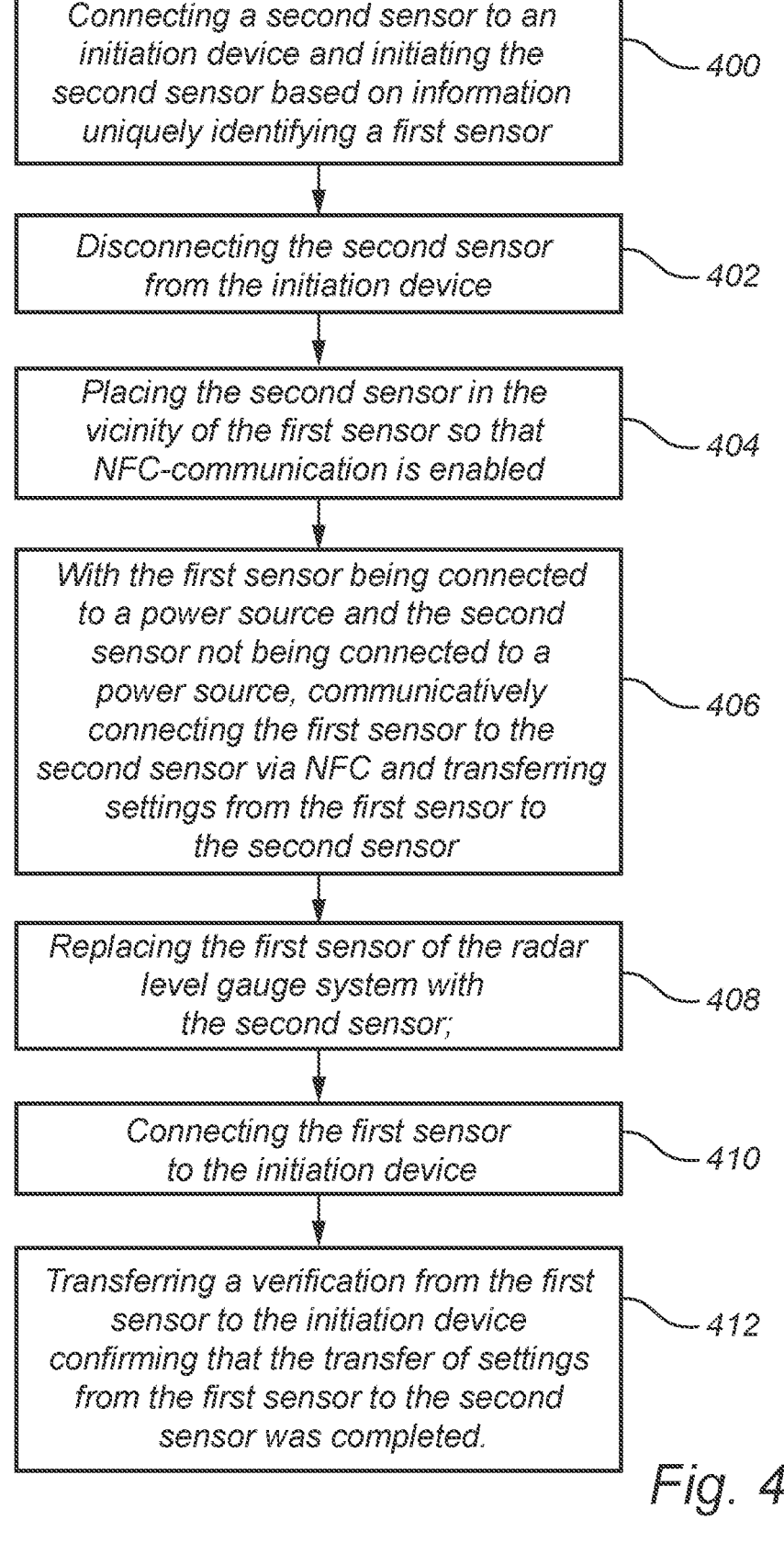
FIG. 4 is a flow chart outlining steps of a method according to an embodiment of the invention.

FIGS. 3A-D schematically illustrate steps of a method according to an embodiment, and the method will be described with further reference to FIG. 4 showing a flow chart outlining steps of a method according to an embodiment of the invention.

The first sensor 102 and second sensor 202 are represented by measurement units as described previously, where the first sensor 102 is a measurement unit which is installed in a tank 105 and which is being replaced. The second sensor 202 is thus a replacement measurement unit to be installed in place of the first sensor 102.

FIG. 3A illustrates a field device arrangement comprising a first sensor 102 and a second sensor 202, both provided with NFC-functionality. The first sensor 102 is arranged on a tank 104 in what may be a hazardous area requiring Ex-classification of devices operating in the area, for example where the tank is filled with a petroleum product.

The field device arrangement further comprises an initiation device 300 comprising an interface enabling connection to each of the first and second sensor 102, 202. The initiation device is located in a remote location in what can be termed non-hazardous area, such as a service center or workshop. The initiation device 300 does thereby not have to be Ex-classified.

To replace the first sensor 102 with a second sensor 202, the method comprises connecting 400 the second sensor to an initiation device 300 and initiating the second sensor 202 based on information uniquely identifying the first sensor 102, such as a serial number. The second sensor 202 is here illustrated as being connected to the initiation device 300 using a wired connection. However, the second sensor 202 may equally well be connected to the initiation device 300 using a wireless connection such as NFC, and power can be provided to the second sensor 202 either wirelessly, through a wired connection with the initiation device 300 or by means of a separate power source.

Next, the second sensor is disconnected 402 the from the initiation device 300 and placed 404 in the vicinity of the first sensor 102 so that NFC-communication is enabled as illustrated in FIG. 3B.

The first sensor 102 is here being connected to a power source and the second sensor 202 is not being connected to an external power source. The second sensor 202 may still have an internal power source such as a battery for backup power or for continuous operation, but by means of the described method, there is no need for the second sensor 202 to have any supply of power. In an example embodiment, the second sensor 202 is thus only powered via the NFC-connection with the first sensor 102.

In the next step, the method comprises communicatively connecting 406 the first sensor 102 to the second sensor 202 via NFC and transferring settings from the first sensor 102 to the second sensor 202. In the case of a sensor in the form of a radar level gauge as illustrated herein, sensor settings to be transferred can for example include information on measurement intervals, alarm levels, communication options etc. Depending on the type of field device, a wide range of information can be transferred from the first sensor 102 to the second sensor 202. Preferably, after communication with the first sensor 102, the second sensor 202 has all the settings required for being operable once installed.

After transferring settings, the first sensor 102 of the field device system is replaced with the second sensor 202 as illustrated in FIG. 3C, and the first sensor 102 is taken back to the location of the initiation device 300.

FIG. 3D illustrates that the first sensor 102 is connected 410 to the initiation device 300 after which a verification is transferred 412 from the first sensor 102 to the initiation device 300 confirming that the transfer of settings from the first sensor 102 to the second sensor 202 was completed.

Figure 5:
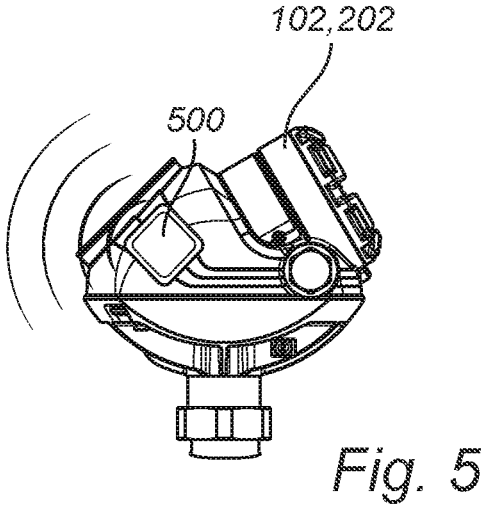
FIG. 5 schematically illustrates a field device system according to an embodiment of the invention.

FIG. 5 schematically illustrates an example embodiment where each of the first and second sensor 102, 202 comprises a respective window 500 which is electromagnetically transparent to a frequency used for NFC which is 13.56 MHz.

Figure 6:
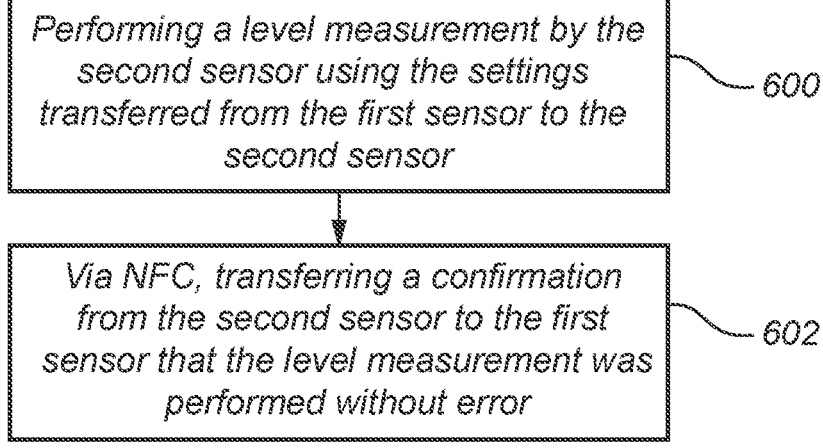
FIG. 6 is a flow chart outlining steps of a method according to an embodiment of the invention.

FIG. 6 outlines additional steps according to an example embodiment including performing 600 a measurement by the second sensor 202 using the settings transferred from the first sensor 102 to the second sensor 202 and via NFC, transferring 602 a confirmation from the second sensor 202 to the first sensor 102 that the measurement was performed without error.

Even though the invention has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for replacing a first sensor with a second sensor in a field device system configured to determine a process variable, each of the first and second sensor being provided with near field communication NFC functionality, the method comprising:

connecting the second sensor to an initiation device and initiating the second sensor based on information uniquely identifying the first sensor;

disconnecting the second sensor from the initiation device;

placing the second sensor in the vicinity of the first sensor so that NFC-communication is enabled;

with the first sensor being connected to a power source and the second sensor not being connected to an external power source, communicatively connecting the first sensor to the second sensor via NFC and transferring settings from the first sensor to the second sensor;

replacing the first sensor of the field device system with the second sensor;

connecting the first sensor to the initiation device; and transferring a verification from the first sensor to the initiation device confirming that the transfer of settings from the first sensor to the second sensor was completed.

2. The method according to claim 1, wherein the field device system is located in a classified hazardous area, and wherein connecting the first and second sensor to the initiation device is performed at a location remote from the field device system which is classified as a non-hazardous area.

3. The method according to claim 1, wherein connecting the first and second sensor to the initiation device is done by NFC where the initiation device is configured to provide power to the first and/or second sensor.

4. The method according to claim 1, wherein the second sensor is configured to receive power from the first sensor via NFC and to store the settings transferred from the first sensor to the second sensor.

5. The method according to claim 1, wherein the information uniquely identifying the first sensor is a serial number of the first sensor.

6. The method according to claim 1, wherein each of the first and second sensor comprises a respective window which is electromagnetically transparent to a frequency used for NFC.

7. The method according to claim 1, wherein the settings transferred from the first sensor to the second comprises a measurement result of a measurement performed by the first sensor.

8. The method according to claim 1, further comprising, after the step of replacing the first sensor with the second sensor:

performing a measurement by the second sensor using the settings transferred from the first sensor to the second sensor; and via NFC, transferring a confirmation from the second sensor to the first sensor that the measurement was performed without error.

9. The method according to claim 8, further comprising transferring the confirmation that the measurement was performed without error from the from the second sensor to the initiation device.

* * * * *